INVENTOR.
GEOFFREY A. FOSBROOK, SR.
BY Max R. Millman
ATTORNEY.

INVENTOR.
GEOFFREY A. FOSBROOK, SR.
BY
Max R. Millman
ATTORNEY

INVENTOR.
GEOFFREY A. FOSBROOK, SR.
BY
Max R. Millman
ATTORNEY.

Jan. 2, 1962 G. A. FOSBROOK, SR 3,015,494
MATERIALS HANDLING CART
Filed Dec. 7, 1959 4 Sheets-Sheet 4
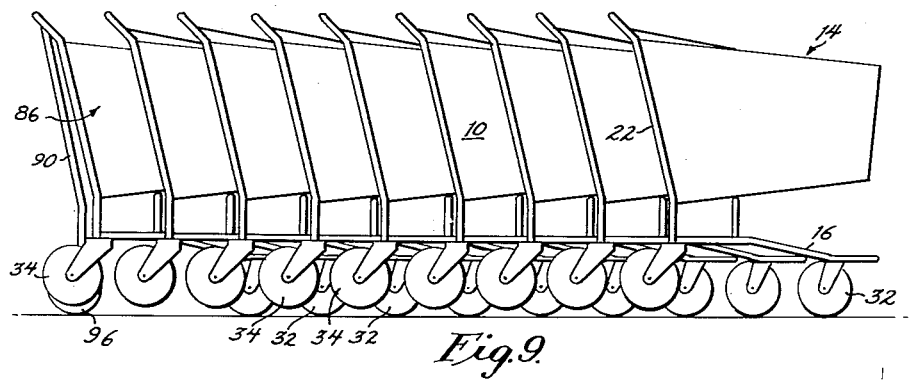
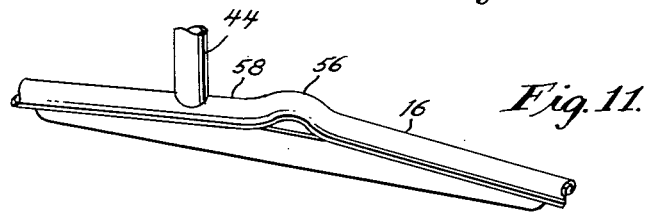
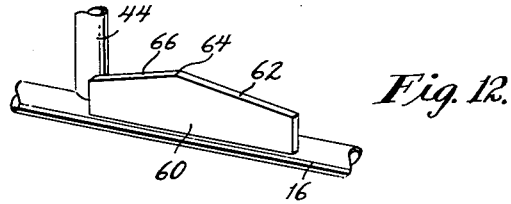
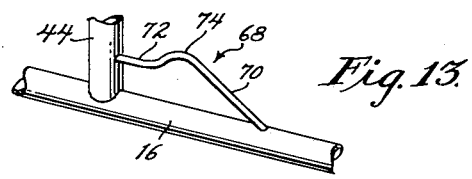
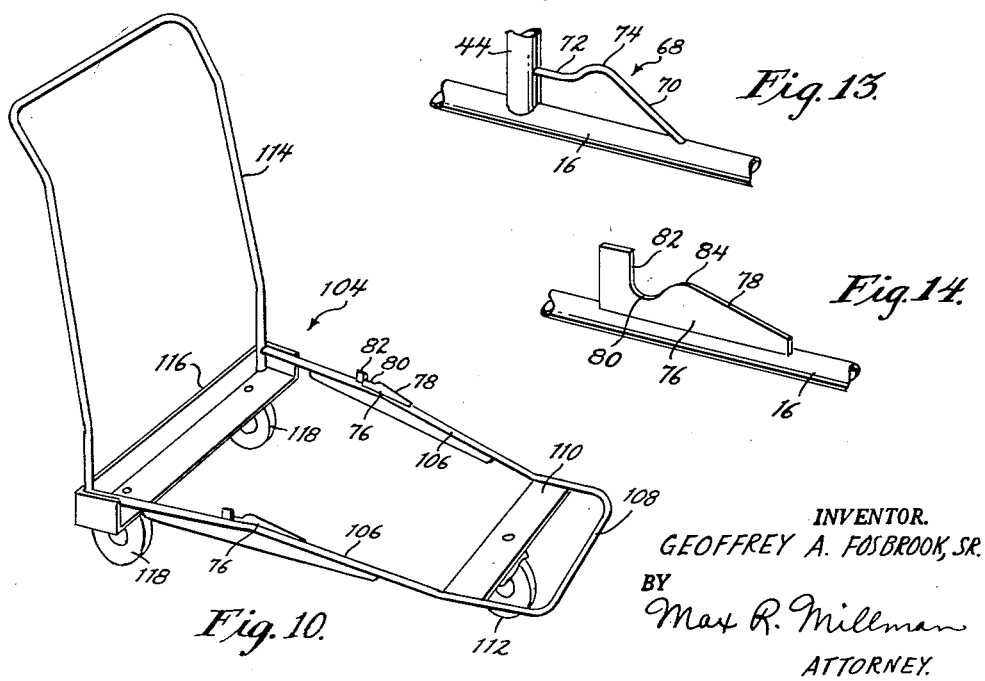
INVENTOR.
GEOFFREY A. FOSBROOK, SR.
BY
Max R. Millman
ATTORNEY.

United States Patent Office 3,015,494
Patented Jan. 2, 1962

3,015,494
MATERIALS HANDLING CART
Geoffrey A. Fosbrook, Sr., Hatboro, Pa.
(Clearview Drive, Jamison, Bucks County, Pa.)
Filed Dec. 7, 1959, Ser. No. 857,873
15 Claims. (Cl. 280—33.99)

This invention relates to a new and improved shopping cart or materials handling cart.

A shopping cart or materials handling cart presently in widespread use at supermarkets consists of a frame carrying a wire basket having a rear pivoted gate. The frame mounts a pair of swivel or caster wheels at the front and a pair of fixed wheels at the rear permitting ease of steering. When retrieving the empty carts, they are nested longitudinally so that the basket of one cart extends into the basket of a forward cart while pivoting upwardly the rear gate of the forward cart. Normally some ten to twenty of such carts are nested to form a train in which all wheels, fixed and swivel, contact the ground. Because the fixed wheels are in engagement with the ground, it is very difficult to manipulate the train of nested carts, especially around turns and corners. Moreover, when the train is pushed or "bulled" around turns or around corners into aisles, a considerable strain is exerted on the members supporting the rear fixed wheels of the carts, causing wheel misalignment and tearing of tires, thereby creating costly maintenance problems.

It is the primary object of this invention to provide a shopping cart or materials handling cart of such construction as will overcome the disadvantages of lack of maneuverability and costly maintenance necessarily associated with conventional carts as mentioned hereinbefore.

Another object of the invention is to provide a shopping cart or materials handling cart having front swivel and rear fixed wheels with means adapted to be operative on a portion of a similar cart and raise the rear fixed wheels thereof so that a train of nested carts may be provided in which only the front swivel wheels are in ground engagement.

Another object of the invention is to provide a train of nested shopping carts or materials handling carts of the character above-described and a removable means including swivel wheels coacting with a portion of the rearmost cart of the train to raise the rear fixed wheels thereof off the ground.

Another object of the invention is to provide a means for raising the rear fixed wheels of a shopping cart or materials handling cart off the ground which may take a variety of forms and which can be readily associated with a conventional shopping cart or materials handling cart as described above without requiring major structural changes in the construction of the cart.

Another object of the invention is to provide shopping carts or materials handling carts of the character described in which the elevation off the ground of the rear fixed wheels of each cart is readily and easily accomplished by simply nesting the carts; and in which the elevation of the rear fixed wheels of the rearmost cart of the train is also easily accomplished with the aid of a carriage of simple construction having swiveled wheels only.

These and other objects of the invention will become more apparent as the following description proceeds in conjunction with the accompanying drawing, wherein:

FIGURE 9 is a diagrammatic view of a train of the instant shopping carts or materials handling carts plus associated retriever;

FIGURE 10 is a perspective view of another form of retriever; and

FIGURES 11–14 are perspective views of modified forms of rear fixed wheel cam raising means associated with each cart.

Specific reference is now made to the drawings wherein similar reference characters are used for corresponding elements throughout.

Figures 1, 2:
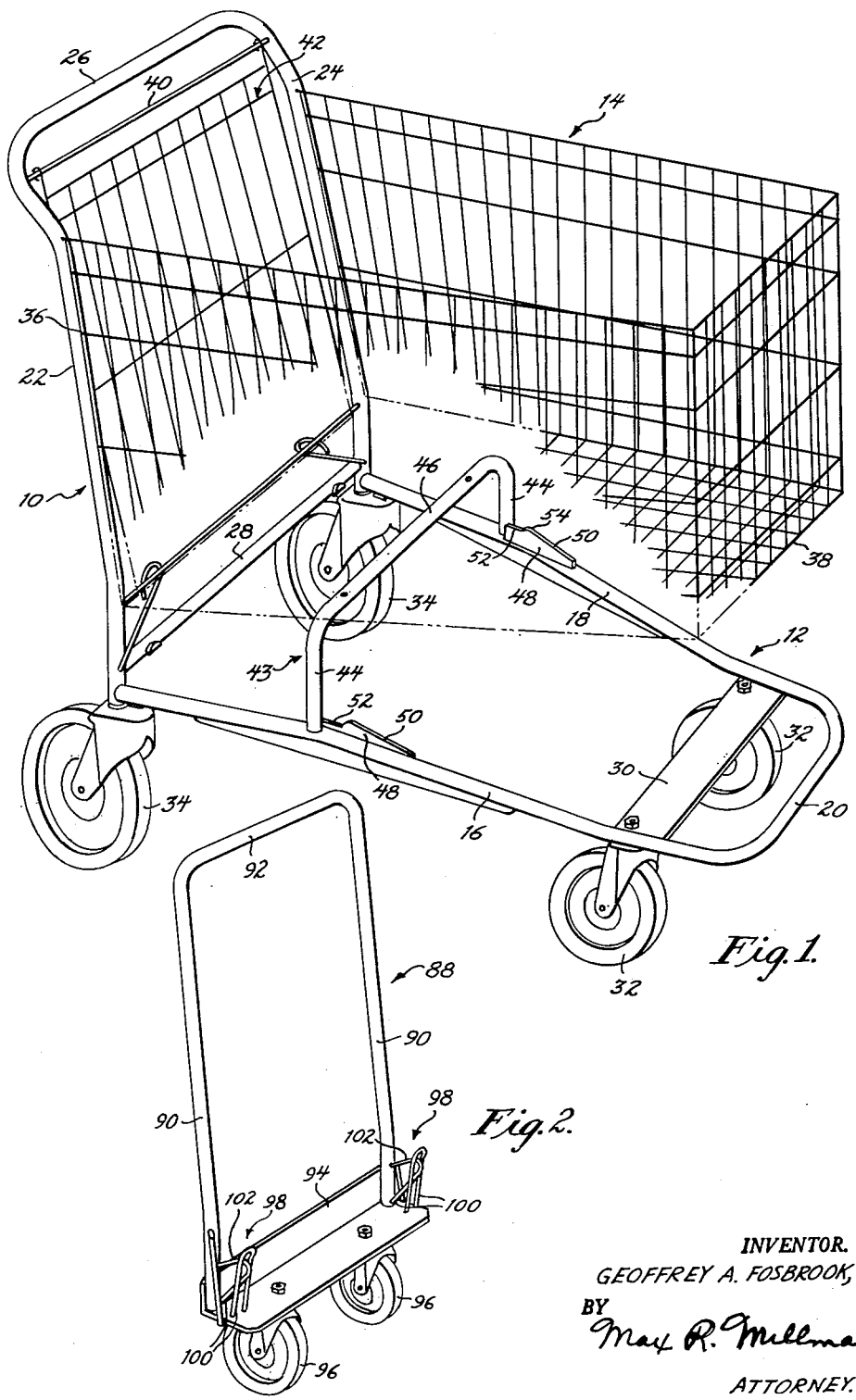
FIGURE 1 is a perspective view of the instant shopping cart or materials handling cart, parts being broken away to disclose details of construction.
FIGURE 2 is a perspective view of a swivel wheel carriage or retriever adapted to raise the rear wheels of the shopping cart or materials handling cart.

The cart is generally indicated at 10 and comprises a frame 12 preferably fabricated of steel tubing and a merchandise container 14 preferably in the form of a steel wire basket whose upper end is open. The frame includes a horizontally extending structure consisting of a pair of longitudinal members 16 and 18 joined by a front member 20 and a vertically extending structure in the form of a generally U-shaped handle the lower ends of whose legs 22 and 24 are joined to the rear ends of the longitudinal members 16 and 18, the upper ends of the legs 22 and 24 being upwardly and rearwardly inclined and joined by a web 26 serving as a hand grip. A transverse rod or member 28 joins the legs 22 and 24 at the rear of the cart just above the longitudinal members 16 and 18.

Figure 4:
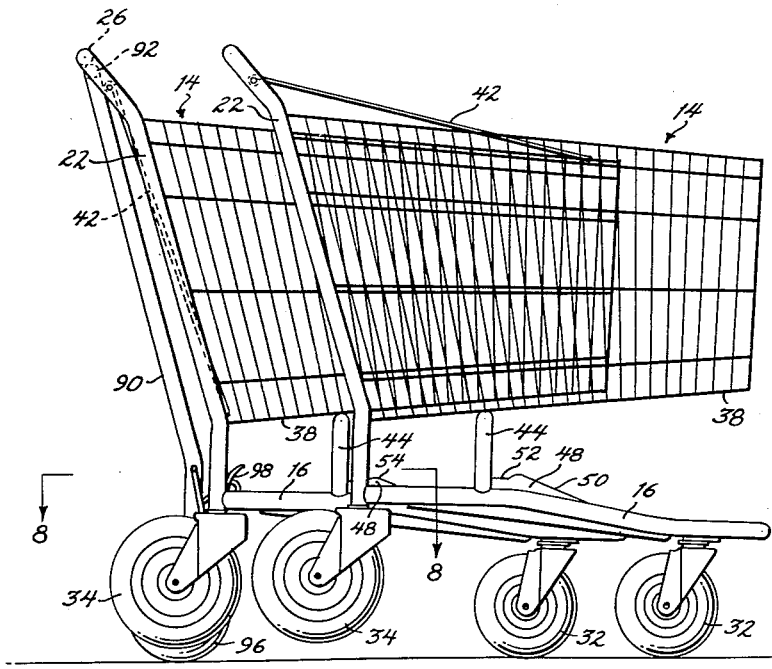
FIGURE 4 is a side elevation of nested carts illustrating the final position of the retriever on the rearmost cart and showing the elevation of the rear fixed wheels of said cart.

The members 16 and 18 carry a plate 30 adjacent the front member 20 which plate mounts in conventional manner a pair of swivel or caster wheels 32 while fixed to lower ends of the legs 22 and 24 are the yokes of fixed or non-swivel rear wheels 34 preferably somewhat larger than the front swivel wheels. The basket 14 includes crossed steel wires, the rear ends of the horizontal wires being secured by any suitable means as at 36 to the legs 22 and 24 with the bottom 38 spaced above the longitudinal members 16 and 18. Extending between the legs 22 and 24 near the hand grip 26 is a rod 40 which pivotally mounts a door or gate 42 designed to swing inwardly of the basket 14 as shown in FIGURE 4 when the carts are nested.

The construction of the cart as described thus far is conventional.

In the nesting of the carts to form a train, as shown in FIGURE 9, a means is provided in each cart which coacts with a forward cart, after predetermined nesting movement, to raise the rear fixed wheels 34 of the forward cart so that only the front swivel wheels 32 are in ground engagement. This means comprises lifting cams, stops to limit relative movement of the carts and desirably means to releasably retain the nested carts in proper position when the rear fixed wheels are off the ground.

In the cart shown in FIGURES 1–9, this means comprises the following elements. A generally U-shaped cross-member 43 is provided, the legs 44 of which are fixed to the longitudinal frame members 16 and 18 at a predetermined position, the web 46 of which is secured to the bottom 38 of the basket and helps support the same. Secured by any suitable means, as by welding, to the longitudinal members 16 and 18 in advance of the cross-member 43 are upstanding cams 48 each having a forwardly and downwardly inclined ramp surface 50 and a rear raised land surface 52 terminating adjacent the legs 44 of the cross-member 43. As shown clearly in FIGURES 4, 6, 7 and 9 when the carts are nested, the basket 14 of a rear cart slides into the basket of a forward cart pushing the pivoted gate 42 upwardly. As the carts move relative to each other, the transverse rear frame member 28 of the forward cart rides on the ramp surfaces 50 of the cams until said member rests on the land surfaces 52, the legs 44 of the cross-member 43 serving as stops. At this point the rear fixed wheels 34 of the forward cart have been raised out of ground engagement. A means is provided in association with the cams 48 to releasably retain the transverse rear frame member 28 on the land surfaces 52, said means including a rounded protuberance 54 adjacent the juncture of the land surface 52 and the ramp surface 50 over which the transverse rear frame member 28 must ride both in the rear fixed wheel-raising and lower operation.

The wheel-raising cam means may take different forms as shown in FIGURES 11–14. In FIGURE 11, the longitudinal frame members 16 and 18 are upwardly and rearwardly inclined and adjacent the legs 44 of the cross-member 43, each longitudinal member is provided with an upstanding, preferably integral curved protuberance 56 defining a land surface 58 between the protuberance and leg 44. The inclination of the longitudinal members 16 and 18 is such that when the carts are moved in the nesting position, the transverse rear frame member 28 of the forward cart rides on the longitudinal members over the protuberances and onto the land surfaces 58 in which position the rear fixed legs of the forward cart have been raised off the ground.

In FIGURE 12, the cam is in the form of a plate 60 secured to each longitudinal frame member 16 and 18 in advance of the legs 44, the forwardly and downwardly inclined ramp surface 62 joining at the high point 64 a downwardly and rearwardly inclined land surface 66 which terminates at the legs 44 that serve as stops.

In FIGURE 13, the cam is in the form of a wire 68 terminally secured to each leg 44 and each longitudinal frame member 16, the wire being shaped like cam 48 previously described. It therefore has a downwardly and forwardly inclined ramp surface 70 and a rear land surface 72 separated by a curved protuberance 74 serving as a releasable retaining means.

In FIGURE 14, the cam is in the form of a plate 76 which is welded to each longitudinal member 16 and 18 of a frame which is not provided with the previously-described basket-supporting cross-member 43. The cam plate 76 includes a downwardly and forwardly inclined ramp surface 78 which is continuous with a rear depressed land surface 80 which in turn is continuous with a vertical surface 82 whose upper end is above the curved high point 84 at which the ramp surface 78 and depressed land surface 80 meet. Thus, when the carts are being nested, the rear transverse frame member 28 of the forward cart rides over the ramp surfaces 78 until it rests in the depressed land surfaces 80, the vertical surfaces 82 to the rear thereof serving as stops. At this position, the rear fixed wheels 34 of the forward cart are out of ground engagement.

Attention is called to FIGURE 9 showing a train of nested carts constructed in accordance with the present invention. Note that all the front caster or swivel wheels are in ground engagement while all the rear fixed wheels are not. It will be understood, however, that before this is attained, a means is provided to raise the rear fixed wheels 34 of the rearmost cart 86. One such means is shown in FIGURES 2–9, another in FIGURE 10.

The means shown in FIGURES 2–9 comprises a carriage or retriever 88 having an elongated generally U-shaped handle consisting of legs 90 and a web 92 at their upper ends serving as a hand grip portion, the lower ends of said legs being connected by a bar 94 which mounts spaced caster or swivel wheels 96. Although two swivel wheels are shown, one centrally of the carriage may also be employed to advantage. Adjacent the ends of the bar 94, open-ended socket members 98 are provided which are formed by crossed wires 100, one member 102 of one of the crossed wires extending upwardly at an angle to provide a cam surface.

Figure 3:
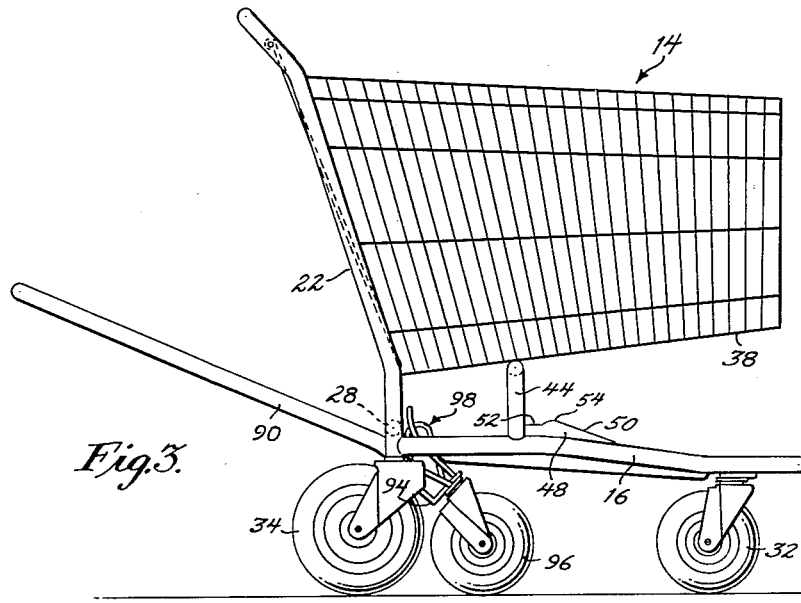
FIGURE 3 is a side elevation of the cart illustrating the initial position of attachment of the retriever thereto.
Figure 5:
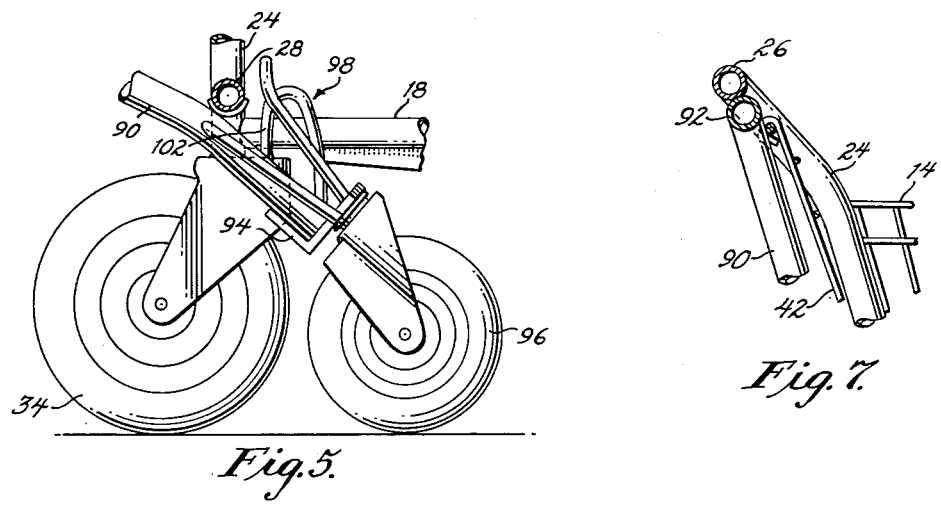
FIGURE 5 is an enlarged elevation of the lower left-hand portion of FIGURE 3, some parts being shown in section, and illustrating the initial position of attachment of the retriever to the cart.
Figure 7:
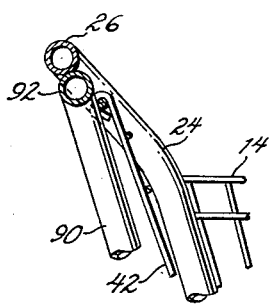
FIGURE 7 is an enlarged vertical sectional view through the handles in the upper left-hand corner of FIGURE 4 showing how the retriever releasably locks to the rearmost cart.
Figure 6:
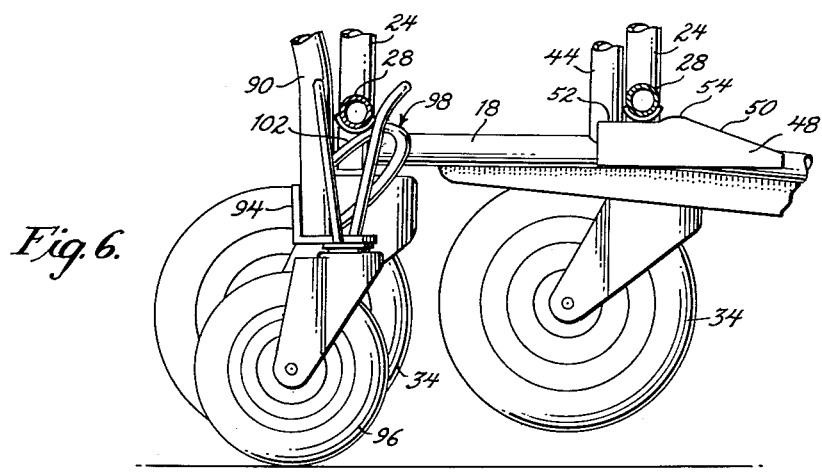
FIGURE 6 is an enlarged elevation of the lower left-hand portion of FIGURE 4, some parts being shown in section, and illustrating the manner in which the retriever raises the fixed wheels of the cart.
Figure 8:
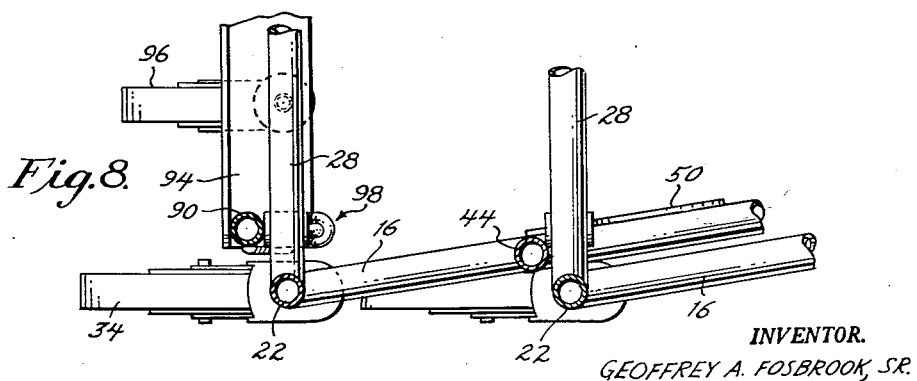
FIGURE 8 is an enlarged section taken on the line 8—8 of FIGURE 4.

In use, the retriever or carriage is positioned beneath the rear transverse frame member 28 of the rearmost cart 86 as shown in FIGURES 3 and 5, the width of the retriever being less than that of the rear end of the cart so that it can slip between the rear fixed wheels 34. In this position the rear transverse member 28 is entering the socket members 98. When the handle 92 is urged upwardly, while the swivel wheels 96 of the retriever engage the ground, to a vertical position almost normal to the ground level, the cam members 102 have pushed upwardly on the rear transverse frame member 28 raising the rear fixed wheels 34 off the ground as shown clearly in FIGURES 4, 6 and 9. In this operative position of the retriever, the web 92 of its handle snaps into releasable locking engagement with the web 26 of the cart handle, as shown in FIGURES 4 and 9, due to the height of the retriever relative to the height of the cart and the fact that the respective handles are somewhat resilient.

In FIGURE 10, the means to raise the fixed wheels of the rearmost cart 86 is in the form of a carriage or retriever 104 which is similar to the cart 10 shown in FIGURES 1–10 except that it has no basket 14 and the cam used is that shown in FIGURE 14. The retriever therefore comprises a pair of longitudinal frame members 106 joined at its front end by a cross-member 108 adjacent which is secured a plate 110 mounting a swivel or caster wheel 112. At the rear, the members 106 are secured to a generally U-shaped handle 114, the lower end of which is in turn secured to a transverse angle bar 116 which mounts a pair of swivel or caster wheels 118. The cam members 76 with their ramp surfaces 78, depressed land areas 80 and stops 82 are secured to the longitudinal members 106 at predetermined locations. Thus, when the retriever 104 is pushed under the rearmost cart 86, it will be understood that the transverse rear frame member 28 of the cart will ride over the ramp surfaces 78 and eventually come to rest in advance of the stops 82 in the depressed land areas 80, at which position the rear fixed wheels 34 of the rearmost cart will be off the ground and the entire train of nested carts will be supported solely on caster or swivel wheels.

The manner of use of the invention should be evident to skilled artisans from the above description. The rear fixed wheels 34 of each cart are automatically raised out of ground engagement simply by nesting one cart into a forward cart until further relative movement is not permissible, at which position the transverse rear member 28 is retained on the land surfaces 52, 58, 66, 72 or 80 of the cam lifts 48, 56, 60, 68 or 76 respectively. When a plurality of carts are so nested, then the retriever 88 or 104 is pushed under the rearmost cart 86 there to raise the rear fixed wheels 34 of the cart off the ground so that the entire train of nested carts is now supported solely on the swivel wheels 32 of the carts and the swivel wheels 96 or 118 of the retriever 88 or 104. This train of nested carts, frequently involving up to 20 units, can be readily maneuvered around corners and into aisles with no strain on the raised fixed rear wheels. Thus ease of handling is provided as well as considerable reduction of maintenance costs.

While preferred embodiments of the invention have here been shown and described, it is understood that skilled artisans may make minor variations without departing from the spirit of the invention and the scope of the appended claims.

I claim:

1. In a train of nested materials handling carts, each cart including a frame having front swivel wheels and rear fixed wheels and a materials-retaining container mounted on said frame; means carried by the frame of one cart coacting with a portion of the frame of an adjacent forward cart raising the rear fixed wheels of said adjacent forward cart out of ground engagement, and means including swivel wheels coacting with a portion of the rearmost cart raising the rear fixed wheels of said rearmost cart out of ground engagement whereby the entire train of nested carts is supported solely upon swivel wheels.

2. The combination of claim 1 wherein said frame includes longitudinal members and a rear transverse member, said first-named means including upstanding cams carried by said longitudinal members and stops behind said cams, each cam including a forwardly and downwardly inclined ramp surface and a rear land surface adjacent said stop, whereby said cam ramp surfaces of said one cart engage the rear transverse member of the frame of said adjacent forward cart causing said rear transverse member, upon relative movement of said carts, to ride on said cam ramp surfaces and ultimately rest upon said land surfaces.

3. The combination of claim 2 and means on said cams releasably retaining said transverse member on said land surfaces.

4. The combination of claim 3 wherein said releasable retaining means includes a protuberance on said land surface adjacent its juncture with said ramp surface.

5. The combination of claim 1 wherein said frame includes longitudinal upwardly and rearwardly inclined longitudinal members and a rear transverse member, said first-named means comprising said upwardly and rearwardly inclined longitudinal members, stops carried by said longitudinal members and protuberances in said longitudinal members in advance of said stops to provide land surfaces between said stops and said protuberances whereby said longitudinal members of said one cart engage the rear transverse member of the frame of said adjacent forward cart causing said transverse member, upon relative movement of said carts, to ride on said longitudinal members over said protuberances and ultimately rest upon said land surfaces.

6. The combination of claim 1 wherein said frame includes longitudinal members and a rear transverse member, said first-named means including upstanding cams carried by said longitudinal members, each cam including a forwardly and downwardly inclined ramp surface, a depressed area to the rear thereof and an upstanding portion behind said depressed area serving as a stop, whereby said cam ramp surfaces of said one cart engage the rear transverse member of the frame of said adjacent forward cart causing said rear transverse member, upon relative movement of said carts, to ride on said cam ramp surfaces and ultimately rest in said depressed areas of said cams.

7. The combination of claim 1 wherein the frame of said rearmost cart includes a rear transverse member and said last-named means includes a carriage mounting swivel wheels having members releasably engaging and retaining said rear transverse member in elevated position with the rear fixed wheels of said rearmost cart off the ground and the swivel wheels of said carriage contacting the ground.

8. The combination of claim 1 wherein the frame of said rearmost cart includes a rear transverse member and said last-named means includes an elongated carriage mounting at least one swivel wheel, and socket members carried by said carriage receiving said transverse member, said socket members including cams operative on said transverse member and elevating the latter when said elongated carriage is in a vertical position almost normal to ground level, at which position the fixed wheels of said rearmost cart are off the ground and said swivel wheel of said carriage contacts the ground.

9. The combination of claim 8 wherein said frame includes a generally U-shaped vertical handle having a web serving as a hand grip and said elongated carriage includes a generally U-shaped handle having a web serving as a hand grip, the webs of said frame and carriage handles interengaging and releasably locking said elongated carriage in its vertical operative position.

10. In a train of nested materials handling carts, each cart including a frame having front swivel wheels and rear fixed wheels and a materials-retaining container mounted on said frame and means carried by the frame of each cart coacting at a predetermined position of nesting with a portion of the frame of an adjacent forward cart raising the rear fixed wheels only of said adjacent forward cart out of ground engagement.

11. The combination of claim 10 wherein said frame includes longitudinal members and a rear transverse member, said means including upstanding cams carried by said longitudinal members and stops behind said cams, each cam including a forwardly and downwardly inclined ramp surface and a rear land surface adjacent said stop, whereby said cam ramp surfaces of said one cart engage the rear transverse member of the frame of said adjacent forward cart causing said rear transverse member, upon relative movement of said carts, to ride on said cam ramp surfaces and ultimately rest upon said land surfaces.

12. The combination of claim 11 and means on said cams releasably retaining said transverse member on said land surfaces.

13. A materials handling cart comprised of a frame having longitudinal generally horizontal members, a rear transverse generally horizontal member and a vertically extending handle, a materials-retaining container secured to said handle having a bottom member spaced above said longitudinal and transverse frame members, said container including a closure member hinged to said handle for movement inwardly of said container, said frame mounting fixed wheels at its rear and swivel wheels at its front, a cross-member secured to said longitudinal frame members at a predetermined location and including a portion supporting said container and upstanding cams carried by said longitudinal members in advance of said cross-member, said cams being adapted to engage the rear transverse member and thereby elevate the rear fixed wheels of a second similar cart when the containers of said carts nest one within the other through the end containing the hinged closure, said cross-member serving as a stop.

14. In combination with a materials handling cart having a frame including front swivel wheels and rear fixed wheels and a materials-retaining container mounted thereon, a means to raise said rear fixed wheels out of ground engagement comprising an elongated carriage mounting at least one swivel wheel, cams on said carriage engaging a rear portion of said frame, and means releasably locking said carriage to said frame in a vertical position substantially normal to ground level, at which position said cams act to raise only said rear fixed wheels out of ground engagement whereby said cart and carriage are supported only on swivel wheels, said releasable locking means including a generally U-shaped vertical handle carried by said frame, said handle having a web serving as a hand grip, and said carriage including a generally U-shaped handle also having a web portion serving as a hand grip, the webs of said frame and carriage handles interengaging and releasably locking said carriage in its vertical operative position.

15. In combination with a materials handling cart having a frame including front swivel wheels and rear fixed wheels and a materials-retaining container mounted thereon, a removable means coacting with a portion of said frame releasably raising said rear fixed wheels out of ground engagement, said frame further including a rear transverse member and a generally U-shaped vertically extending handle having a web serving as a hand grip, and said means including an elongated carriage including a generally U-shaped handle having a web serving as a hand grip, said carriage mounting at least one swivel wheel and including socket members receiving said transverse frame member with cams in said socket members operative on said transverse frame member to elevate the latter and said rear fixed wheels when the webs of said frame and carriage handles interengage to releasably lock said frame and carriage together and said carriage is in a vertical position nearly normal to ground level.

References Cited in the file of this patent

UNITED STATES PATENTS

| | | |
|---|---|---|
| 1,000,163 | Ellis | Aug. 8, 1911 |
| 1,234,667 | Howe et al. | July 24, 1917 |
| 1,262,853 | Schrankel | Apr. 16, 1918 |
| 1,588,419 | Hickey | June 15, 1926 |
| 1,750,639 | Jones | Mar. 18, 1930 |
| 1,915,881 | Domke et al. | June 27, 1933 |
| 2,556,532 | Goldman | June 12, 1951 |

FOREIGN PATENTS

| | | |
|---|---|---|
| 105,428 | Great Britain | Apr. 19, 1917 |
| 115,980 | Great Britain | May 30, 1918 |